Figure 1:
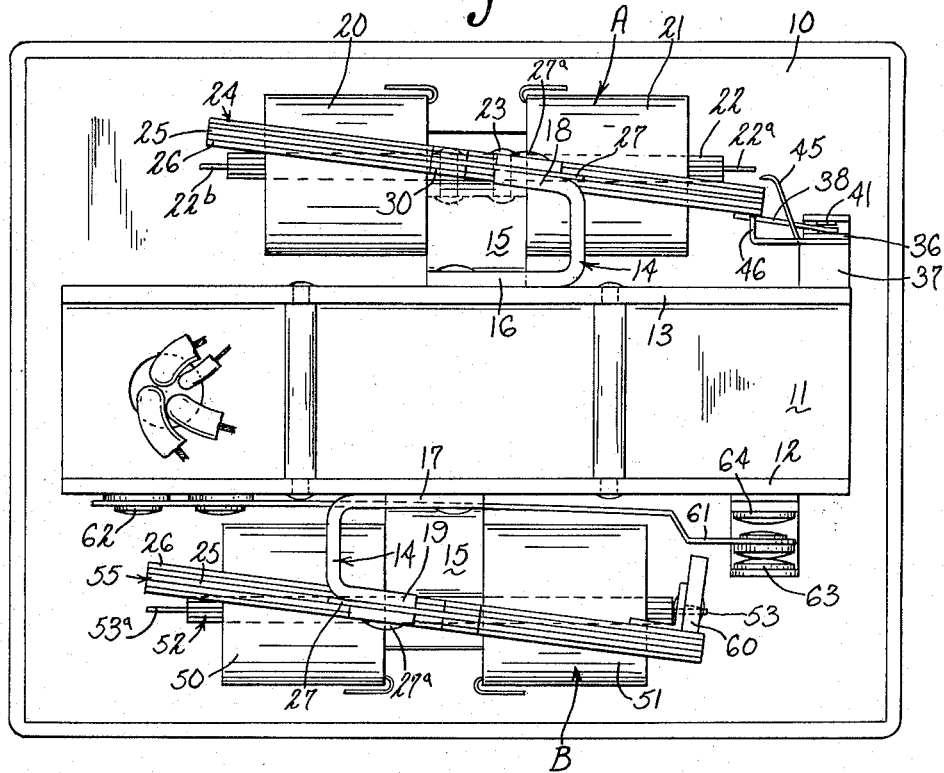

March 31, 1964 T. W. KENYON 3,127,487
PLURAL ELECTROMAGNETIC RELAY CONTACT STRUCTURE
Filed Nov. 9, 1959 3 Sheets-Sheet 1

INVENTOR
Theodore W. Kenyon
BY
ATTORNEYS

March 31, 1964    T. W. KENYON    3,127,487
PLURAL ELECTROMAGNETIC RELAY CONTACT STRUCTURE
Filed Nov. 9, 1959    3 Sheets-Sheet 2
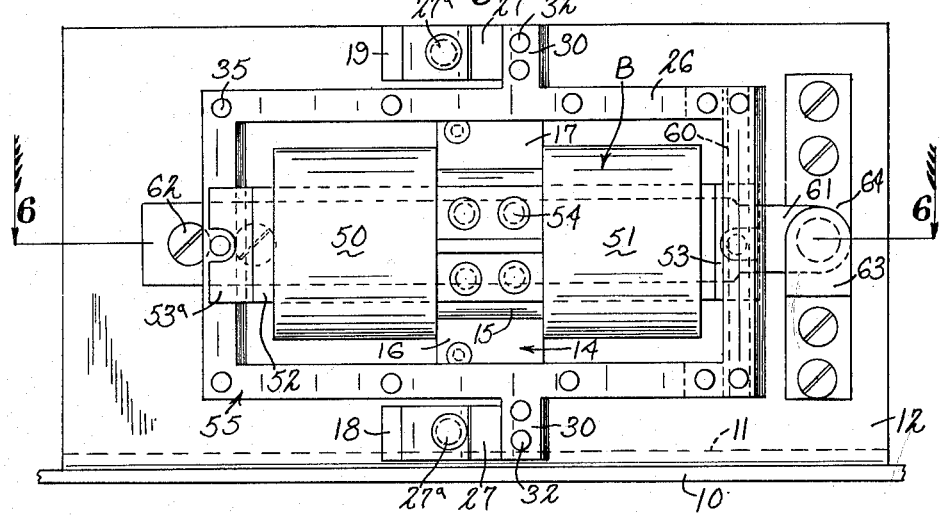
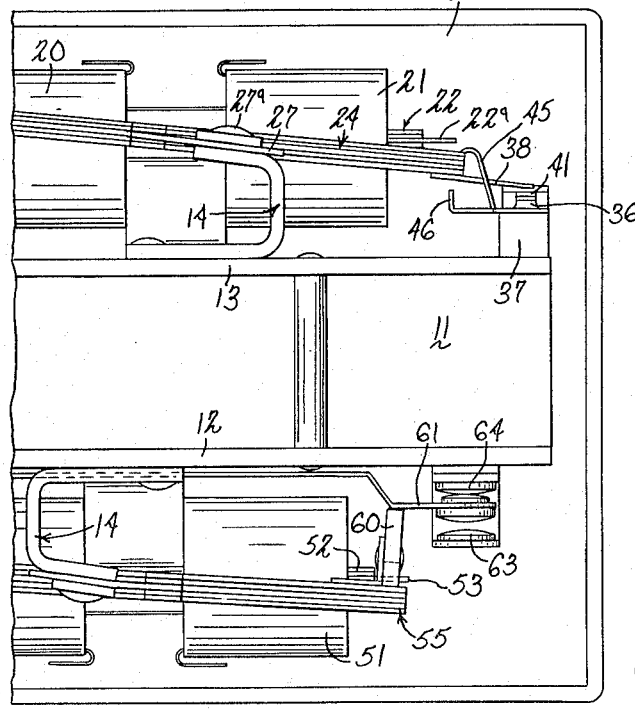
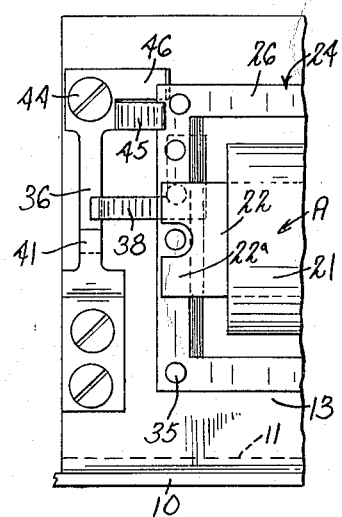
INVENTOR
Theodore W. Kenyon
BY Rockwell & Bertholomew
ATTORNEYS

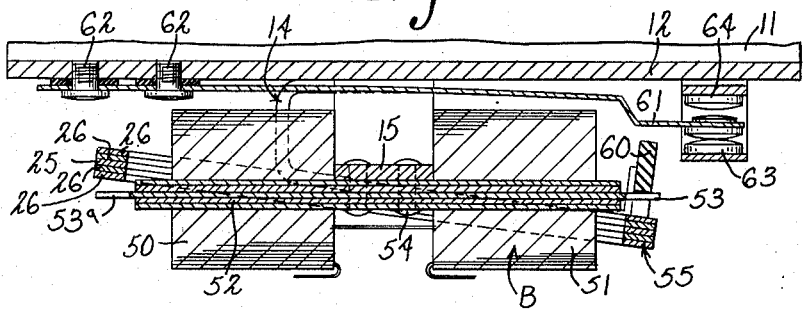

United States Patent Office 3,127,487
Patented Mar. 31, 1964

3,127,487
PLURAL ELECTROMAGNETIC RELAY CONTACT STRUCTURE
Theodore W. Kenyon, Lyme, Conn., assignor, by mesne assignments, to Connecticut Valley Enterprises, Incorporated, Essex, Conn., a corporation of Connecticut
Filed Nov. 9, 1959, Ser. No. 851,578
9 Claims. (Cl. 200—98)

This invention relates to a relay structure and more particularly to a structure adapted for use in charging a battery from a generator such, for example, as might be used for a starting battery for an internal combustion motor where the battery is recharged from a generator driven from the motor.

As illustrated the relay structure comprises two relay units, namely a control or sensing relay designated by the reference character A and a power relay designated by the reference character B. The energization of the control relay from the battery makes a contact which energizes the power relay and the latter controls the delivery of the charging current to the battery to be charged.

In devices of this character it is desirable to provide a dual-rate current generator so that the battery may be charged at one rate when the battery voltage is comparatively low and at a lower rate when the battery voltage is high. The relay structure is employed to switch the charging connections to the battery from the low to the high rate when the battery is low and the charge therein needs to be built up.

A relay thus employed is often mounted on a part of the system subject to vibration, it being mounted in some instances on the engine itself. Therefore, it should be of sturdy construction and built to withstand vibration so that the vibration will not serve to close the contacts and thus change the charging rate when that is not desired. Moreover, when the charging rate is high, a high amperage is obtained, and it sometimes occurs that the contacts are welded and are difficult to break. It is, therefore, desirable not only to have a comparatively heavy-duty relay to break these contacts, but also to provide a hammer action on the movable contact so as to break the weld between it and the stationary contact when the power relay is actuated.

It is also desirable to provide a sensitive control, and to that end the sensing or control relay which is employed is sensitive to changes in the battery voltage. Moreover, the armatures of both the sensing and power relays in the present structure are well balanced and are pivoted by torsion springs so that they will be normally biased in one direction by these springs and moved in the other direction upon energization of the relay coils. The torsion springs are of such a character that the armatures will be held thereby in their normal position and not moved out of such position by forces due to vibration.

One object of the present invention is to provide a relay structure of novel design which will withstand vibration without changing the position of the movable contact or contacts of the relay.

Still another object of the invention is to provide a relay of novel structure comprising a sensing or control relay and a power relay energized by actuation of the control relay, the device being of sturdy construction, and the relay armatures being biased in one direction by torsion springs.

Still another object of the invention is to provide a relay structure of the character described which will not only be sturdy and withstand vibration, but will also be sensitive to changes in the battery voltage so as to deliver a charge to the battery at a high rate when that is desired and at a low rate when that is desired.

To these and other ends the invention consists in the novel features and combinations of parts to be hereinafter described and claimed.

Figure 2:
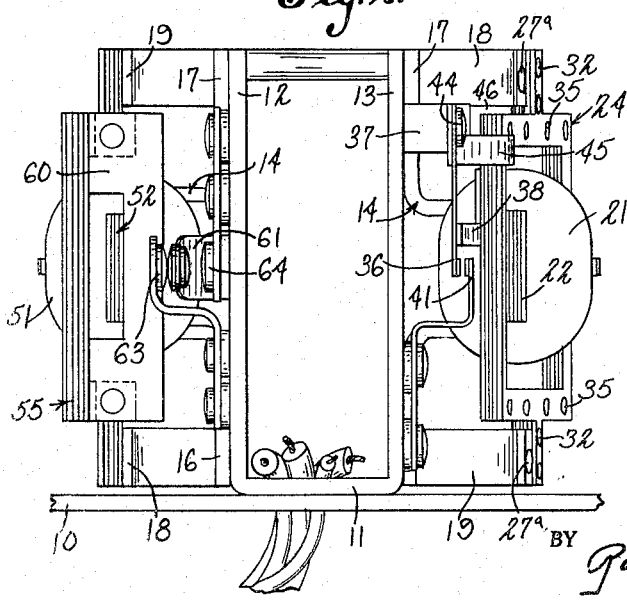

In the accompanying drawings:
FIG. 1 is a top plan view of a relay structure embodying my invention;
FIG. 2 is an end elevational view thereof;
FIG. 3 is a side elevational view of the power relay;
FIG. 4 is a fragmentary side elevational view of a portion of the sensing relay;
FIG. 5 is a fragmentary view similar to FIG. 1 but showing the parts in another position;
FIG. 6 is a sectional view on line 6—6 of FIG. 3;
FIGS. 7 and 8 are elevational views of the laminae employed in the armatures of the relays;
FIG. 9 is a perspective view of one of the brackets employed to support the relays; and
FIG. 10 is a wiring diagram which may be employed including the battery to be charged, the sensing and control relays, the rectifier and generator.

To illustrate one embodiment of the invention there is shown in the drawings a relay structure comprising a base plate 10 having a U-shaped frame mounted thereon, this frame comprising a web or base portion 11 and upstanding plates 12 and 13. Secured to each one of these plates is a bracket shown at 14 in FIG. 9. Each of these brackets comprises a central U-shaped portion 15 adapted to be secured to the core of the coils of one of the relay units, as will be hereinafter explained, and extended end portions 16 and 17 which are secured to one of the plates 12 and 13. Upon each of the extensions 16 and 17 is a lug designated at 18 and 19 to which the armatures are connected. As previously stated the relay structure comprises two relay units A and B. The unit A includes the coils 20 and 21 which are joined by the core 22, this core being secured to the U-shaped portion 15 of the associated bracket member 14 by rivets 23 shown in dotted lines on FIG. 1, thus fixing the coil structure rigidly in position with respect to the plate 13.

The armature consists of a hollow rectangular structure embracing the coils as indicated at 24. This member comprises a plurality of hollow rectangular laminae 25 and 26, as shown in FIGS. 7 and 8. The member 25 is provided centrally of the armature and the members 26 are applied flatwise to both sides thereof. As shown there are four of the laminae 26 employed, two on each side of the member 25, but this may be varied as desired. It may here be noted also that the core member 22 is also laminated and the central laminations are provided with extensions 22$^a$ and 22$^b$ to serve as limit stops for the armature.

The lamina 25 is provided with lugs 27, as shown in FIG. 7, which lugs have openings 28 therethrough and also larger openings 29. The laminae 26 are provided with lugs 30 having openings 31 therein which register with the openings 28 of the lugs 27 so that fastening members 32 can be passed therethrough to secure the laminae together. Likewise both the laninae 25 and 26 are provided on their sides and ends with openings 33 and 34 through which securing rivets 35 may be passed.

The lugs 27 of the lamina 25 are secured by means of rivets 27$^a$ to the members 18 and 19 of the bracket 14. This lamina together with the lugs 27 is of resilient material so that the lugs act as torsion springs to bias the armature away from the poles 22$^a$ of the core.

Referring particularly to FIGS. 2 and 4, a contact member 36 is secured to an insulating block 37 mounted upon the frame member 13, which contact is of conducting material and is adapted to be engaged by an actuating arm 38 secured to the armature 24. As will be seen from the wiring diagram of FIG. 10, this contact is electrically connected by a wire 39 with one pole of the battery 40 to be charged.

Also secured to the member 13 is a cooperating contact 41 adapted to be engaged by the contact 36, the latter being tensioned in a direction toward the contact 41 but held in spaced position therewith by the armature 24. When the actuator 38 is moved away from the spring contact member 36 the latter will engage the contact 41 which, as shown in the wiring diagram of FIG. 10, is connected by a wire 42 with the coil of the power relay to be hereinafter described.

The spring contact member 36 is secured to the frame 13 by a screw 44 and is provided with spaced laterally directed arms 45 and 46 which serve to limit the movement of the armature in opposite directions, as shown in FIGS. 1 and 5, the latter being the limiting member when the relay is deenergized, as shown in FIG. 1, and the member 45 being the limiting member when the magnet is energized, as shown in FIG. 5.

The power relay B is constructed similarly to the relay A except that it is more powerful. It consists of the coils 50 and 51 and the core 52 with the poles 53 and 53a similar to the corresponding parts of the relay unit A. The core is secured by rivets 54 (FIG. 3) to the portion 15 of the associated bracket 14. Similarly the armature 55 of this unit is formed of laminae identical with those shown at 25 and 26 in FIGS. 7 and 8 and are connected to the parts 18 and 19 of a bracket 14 by the spring lugs 27 (FIG. 3) as previously described in connection with the unit A.

The coils 50 and 51 of this unit are electrically connected and are electrically connected with the wire 42 of the contact 41 and are connected to one pole of the battery by the wire 57 (FIG. 10). The armature is provided with an actuating member 60 designed to be normally spaced from a spring contact member 61 secured at one end to the member 12 by rivets 62 (FIG. 1). When the coils 50 and 51 are energized, the actuating member will be caused to strike the contact member 61 with a hammer blow and move this member out of engagement with a contact 63 and into engagement with a contact 64, both of which contacts are secured to the frame member 12 (FIG. 2).

The contact 63 is connected to the high-charging-rate side of a dual-rate generator 65 by the wire 63a while the contact 64 is connected to the low-charging-rate side of this generator (FIG. 10) by the wire 64a. As the generator is usually of the alternating current type, a bridge rectifier indicated at 66 is employed and is connected to the generator through the wires 67 and 68 and contacts 63 and 64, to the battery by the wires 69 and 69a, and to the spring contact member 61.

As shown in the wiring diagram, the parts are in the de-energized position or the position which will be assumed when the battery voltage is low. As will be noted, the coils 20 and 21 are not energized and the armature 24 stands in the position shown in FIGS. 1 and 2 with the contacts 36 and 41 disengaged. In this position the contact 61 stands in engagement with the contact 63 so as to connect one pole of the battery with the high-charging pole of the alternator 65, the connection being made through the wires 63a and 67 and the rectifier 66. The other pole of the battery will be connected through the rectifier 66 and the wire 68 to the other pole of the alternator, and the battery will be charged at a high rate.

When the battery becomes charged, the coils 20 and 21 of sensing unit A will be energized, thus causing the armature 24 to be moved to the position shown in FIG. 5. This moves the actuating arm 38 away from the contact 36 and permits the latter by its resilience to engage the contact 41, thus energizing the coils 50 and 51 of relay unit B from the battery 40 through wires 39, 42, and 57. The armature 55 is now actuated, and the actuator 60 carried thereby strikes the contact member 61, moving it from engagement with the contact 63 into engagement with the contact 64. This now connects one pole of the battery with the low-rate-charging pole of the alternator 65, through rectifier 66, wire 67, contact 64 and wire 64a, the other pole of the battery being connected to the other pole of the alternator through the rectifier and the wire 68. The battery will now be charged at a low rate.

While I have shown and described an embodiment of my invention, it will be understood that it is not to be limited to all the details shown, but is capable of modification and variation within the spirit of the invention and within the scope of the claims.

What I claim is:

1. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature extending axially of the core and having an opening therein in which the core is received, supporting means for the armature connected to the core between the coils, and a resilient member connected to the supporting means and to the armature to support the armature for movement about an armature axis substantially midway between the ends of the armature, whereby the armature may be rotated toward and away from the magnet poles responsive to energization and de-energization respectively of the electro-magnet.

2. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being alinged with the core axis; the relay also comprising an armature extending axially of the core and having an opening therein in which the core is received, supporting means for the armature connected to the core between the coils, and a flat spring member connected to the supporting means and to the armature to support the armature for torsional movement about an armature axis substantially midway between the ends of the armature, whereby the armature is rotated toward and away from the magnet poles responsive to energization and de-energization respectively of the electromagnet.

3. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature extending axially of the core and having an opening therein in which the core is received, supporting means for the armature connected to the core between the coils, and a flat spring member connected to the supporting means and to the armature to support the armature for torsional movement about an armature axis substantially midway between the ends of the armature, the ends of the armature lying on opposite sides of the magnet poles, whereby the armature is rotated toward and away from the magnet poles responsive to energization and de-energization respectively of the electromagnet.

4. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature of oblong shape extending axially of the core with the core and coils disposed within the opening of the armature, a supporting means for the armature connected to the core between the coils, torsion spring members connecting each of two opposite sides of the armature to the supporting means to support the latter for torsional movement about an armature axis through the torsion spring members, the torsion spring members biasing the armature to a position in which the plane thereof crosses the core axis and permitting rotational movement of the armature, whereby its end portions are moved toward the magnet poles responsive to energization of the electromagnet.

5. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature extending generally axially of the core, the armature being in the form of an open frame of oblong shape and embracing the core and pair of coils, supporting means for the armature connected to the core between the coils, and resilient members connected to the supporting means and to the armature to support the latter for torsional movement about an armature axis, one of the resilient members being connected to each of the opposite sides of the armature substantially midway between the ends thereof, and the contacting member actuated by the armature, whereby the ends of the armature are moved toward and away from the magnet poles responsive to energization and de-energization of the electromagnet.

6. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature extending axially of the core and being of oblong form providing an opening therein in which the coil is received, supporting means of the armature and core connected to the core between the coils, a resilient member connecting the armature to the supporting means, the member being connected to the armature at a point substantially midway between the ends of the latter to permit swinging movement of the armature about an armature axis about which it is substantially balanced, the spring member normally urging the armature away from the magnet poles, a movably mounted contact member, an actuating member carried by the armature to engage and move the contact member, and the actuating member being normally spaced from the contact member to strike a hammer blow thereon when the electromagnet is energized and the armature swings about the armature axis toward the magnet poles.

7. A relay comprising an electromagnet including a pair of spaced coils and a core extending through each coil of the pair, the core having an axis and a pair of magnet poles, one pole of the pair being adjacent one end of the core axis and the other pole being adjacent the other end of the core axis, the coils being aligned with the core axis; the relay also comprising an armature extending axially of the core and having an opening therein in which the core and pair of coils are received, supporting means for the armature connected to the core between the coils, and a resilient member connecting the armature to the supporting means, the resilient member being connected to the armature at a point substantially midway between the ends of the latter and urging the armature away from the magnet poles.

8. The invention as defined in claim 7, in which the armature comprises a frame member embracing the coils within it and is formed of laminated sections, and in which one of the laminated sections carries lug members connected by the resilient members to the supporting means.

9. A relay structure comprising a sensing relay unit, a power relay unit energized upon energization of the sensing relay unit, a pair of spaced switch contacts, a third contact movably mounted to be moved into engagement with one or other of the spaced contacts, the sensing relay unit having a first armature, the power relay unit having a second armature, an actuating member carried by the second armature and adapted to engage and move the third contact when the power relay unit is energized, the actuating member being normally spaced from the third contact whereby it strikes a hammer blow thereon upon actuation of the armature, a supporting means for the two relay units, each relay unit having an electromagnet, the electromagnets being symmetrical, and the first and second armature being mounted in balanced fashion at opposite sides of the supporting means.

References Cited in the file of this patent

UNITED STATES PATENTS

| | | |
|---|---|---|
| 1,149,054 | Hoppe | Aug. 3, 1915 |
| 1,383,494 | Soreng | July 5, 1921 |
| 1,391,232 | Wilson | Sept. 20, 1921 |
| 1,562,646 | Kaisling | Nov. 24, 1925 |
| 1,946,777 | Butusov | Feb. 13, 1934 |
| 2,178,656 | Swenson | Nov. 7, 1939 |
| 2,307,025 | Creveling | Jan. 5, 1943 |
| 2,323,961 | Zupa | July 13, 1943 |
| 2,353,377 | Vaughn | July 11, 1944 |
| 2,427,729 | Jenkins | Sept. 23, 1947 |
| 2,470,614 | Gieselman et al. | May 12, 1949 |
| 2,616,993 | Koehler | Nov. 4, 1952 |
| 2,777,980 | Menzel | Jan. 15, 1957 |
| 2,786,915 | Zupa | Mar. 26, 1957 |
| 2,800,552 | Durant et al. | July 23, 1957 |